(12) United States Patent
Edara et al.

(10) Patent No.: US 9,929,788 B2
(45) Date of Patent: Mar. 27, 2018

(54) RECONFIGURING MIMO COMMUNICATION LINKS

(75) Inventors: Kiran K. Edara, Cupertino, CA (US); Varada Gopalakrishnan, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 95 days.

(21) Appl. No.: 13/482,854

(22) Filed: May 29, 2012

(65) Prior Publication Data

US 2013/0322267 A1    Dec. 5, 2013

(51) Int. Cl.
| | |
|---|---|
| *H04L 12/26* | (2006.01) |
| *H04B 7/06* | (2006.01) |
| *H04L 1/00* | (2006.01) |
| *H04L 1/06* | (2006.01) |
| *H04B 7/0417* | (2017.01) |

(52) U.S. Cl.
CPC .......... *H04B 7/0639* (2013.01); *H04B 7/063* (2013.01); *H04B 7/0632* (2013.01); *H04L 1/0016* (2013.01); *H04L 1/0026* (2013.01); *H04L 1/06* (2013.01); *H04B 7/0417* (2013.01)

(58) Field of Classification Search
CPC ............. H04W 24/10; H04W 36/0083; H04W 36/0088; H04W 36/0094; H04W 72/005; H04W 72/04; H04W 72/0406; H04W 72/0413; H04W 72/042; H04W 48/08; H04W 24/02; H04L 1/20; H04L 1/0026; H04L 1/0035; H04L 1/1671; H04L 5/0055; H04L 5/001; H04L 1/0016; H04L 1/06; H04B 7/0626; H04B 7/0632; H04B 7/063; H04B 7/0639

USPC ....... 370/236, 252, 329, 332, 336, 468, 328; 455/436, 69, 423

See application file for complete search history.

(56) References Cited

U.S. PATENT DOCUMENTS

| | | | |
|---|---|---|---|
| 2008/0268840 A1 | 10/2008 | McDonald | |
| 2009/0215442 A1* | 8/2009 | Lindoff et al. | 455/423 |
| 2011/0317635 A1* | 12/2011 | Swaminathan | H04W 36/0088 370/329 |
| 2012/0176926 A1* | 7/2012 | Jang | H04W 24/02 370/252 |
| 2013/0194947 A1* | 8/2013 | Ehsan et al. | 370/252 |
| 2013/0303168 A1* | 11/2013 | Aminzadeh Gohari et al. | 455/436 |

FOREIGN PATENT DOCUMENTS

| | | |
|---|---|---|
| EP | 2398285 A1 | 12/2011 |
| WO | WO 2010/081055 | 7/2010 |
| WO | WO 2011/047080 | 4/2011 |
| WO | WO 2012/045143 | 4/2012 |

OTHER PUBLICATIONS

Search Report and Written Opinion for PCT/US2013/042515, dated Sep. 4, 2013.
Preliminary Report on Patentability for PCT/US2013/042515, dated Dec. 2, 2014.
European Communication Pursuant to Article 94(3) EPC, for EP 13 730 390.5-1874, dated Mar. 17, 2017, 6 pages.

\* cited by examiner

*Primary Examiner* — Harun Chowdhury
(74) *Attorney, Agent, or Firm* — Lowenstein Sandler LLP

(57) ABSTRACT

A plurality of communication links are established between a user device and a base station. The user device may determine if one or more criteria are satisfied and may reconfigure one or more of the plurality of communication links, based on the one or more criteria.

20 Claims, 7 Drawing Sheets

RECONFIGURING MIMO COMMUNICATION LINKS

BACKGROUND OF THE INVENTION

A large and growing population of users enjoys entertainment through the consumption of media items, including electronic media, such as electronic books (also referred to herein as ebooks), electronic newspapers, electronic magazines, and other electronic reading material. Users employ various electronic devices to consume such publications. Among these electronic devices are electronic book readers, cellular telephones, personal digital assistants (PDAs), smart phones, portable media players, tablet computers, electronic pads, netbooks, desktop computers, notebook computers, and the like.

These electronic devices often use wireless communication systems to download or upload digital media items. Wireless communication systems which use multiple-input-multiple-output (MIMO) communication protocols such as Long Term Evolution (LTE), LTE Advanced, Worldwide Interoperability for Microwave Access (WiMAX), WiFi (e.g., 802.11n, 802.11ac, etc.), and High Speed Packet Access Plus (HSPA+) allow for faster download and upload speeds for data (e.g., for the digital media items). Electronic devices which use MIMO communication protocols have multiple antennas which are used to establish multiple communication links with other devices (e.g., a base station, a NodeB, a cell tower, other electronic device, etc.).

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION OF THE PRESENT INVENTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for a communication link manager (on a user device) which can reconfigure one or more MIMO communication links. In one embodiment, communication link manager may establish one or more communication links with a base station. The communication link manager may determine whether one or more communication link criteria are satisfied. If one or more communication link criteria are satisfied, the communication link manager may generate and send a measurement message which includes measurement data that is not indicative of the actual states or conditions of the plurality of communication links (e.g., the measurement data may be incorrect data or information or may not reflect actual states or conditions measured by a user device). The communication link manager may receive a reconfiguration message from the base station and may reconfigure one or more of the plurality of communication links based on the reconfiguration message.

Figure 1:
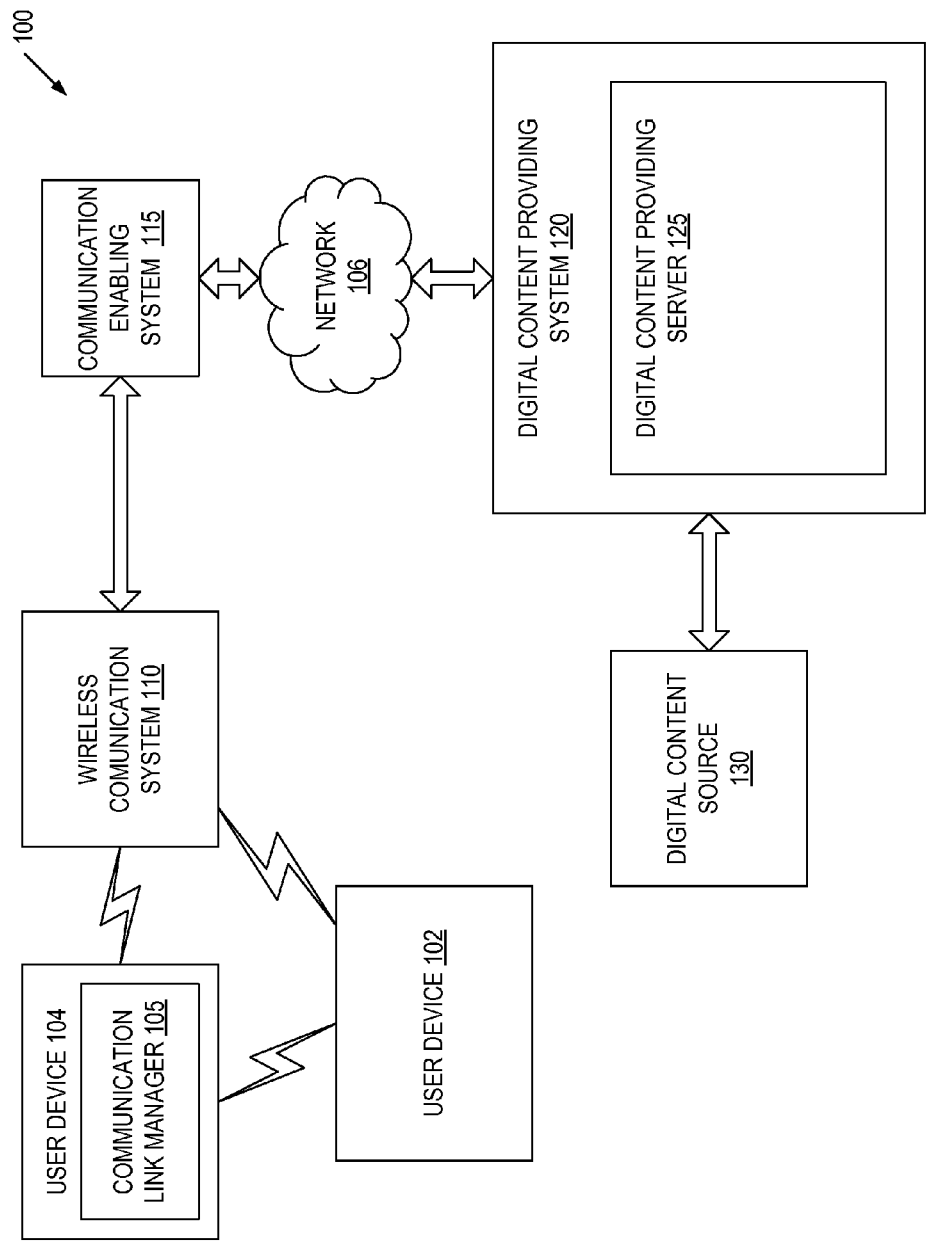
FIG. 1 is a block diagram of an exemplary network architecture, in which embodiments of the present invention may operate.

FIG. 1 is a block diagram of an exemplary network architecture 100, in which embodiments of the present invention described herein may operate. The network architecture 100 may include a digital content providing system 120 and one or more user devices 102, 104 capable of communicating with the digital content providing system 120 via a network 106. Network 106 may include, for example, any combination of a public network such as the Internet, a wireless network (e.g., an 802.11n network, an 802.11ac network, etc.), and a private network such as a local area network (LAN).

The user devices 102, 104 may be portable computing devices such as electronic book readers or tablet computers (e.g., that include a book reader application). Other examples of portable computing devices include cellular telephones, smart phones, personal digital assistants (PDAs), portable media players, netbooks, and the like. The user devices 102, 104 may also be non-portable computing devices such as a desktop computer, a set-top box associated with a television, a gaming console, and so on. The user devices 102, 104 are variously configured with different features to enable consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), audio files, and multi-media content.

The digital content providing system 120 may correspond to any feature or combination of features for providing electronic media items or other digital content to the user devices 102, 104. The digital content providing system 120 may include a network-accessible server-based functionality (digital content providing server 125), various data stores (not shown), and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, the digital content providing server 125 corresponds to an entity which provides electronic media items (e.g., electronic books, digital video, digital audio, etc.) to users upon the users' purchase of the items. In this role, the digital content providing server 125 may essentially act as a bookseller or the like. In other cases, the digital content providing server 125 corresponds to an entity which provides electronic media items to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 125 may deliver, and the user devices 102, 104 receive, electronic media items (or other media items), search results, upgrades, and/or other information via the network 106. For example, the user devices 102, 104 may download or receive ebooks from the digital content providing server 125. The digital content providing server 125 may also receive various requests (e.g., search queries), instructions and other data from the user devices 102, 104 via the network 106.

Communication between the user devices 102, 104 and the item providing system 120 may be enabled via any communication infrastructure. One example of such an infrastructure includes a combination of a wide area network (WAN) and wireless infrastructure, which allows a user to use the user devices 102, 104 to purchase digital content (e.g., electronic media items) and consume the digital content without being tethered to the digital content providing system 120 via hardwired links. The wireless infrastructure may be provided by one or multiple wireless communications systems, such as wireless communication system 110. In one embodiment the wireless communication system 110 may be use a multiple-input-multiple-output (MIMO) communication protocol. For example, the wireless communication system 110 may use the Long Term Evolution (LTE) communication protocol, a Worldwide Interoperability for Microwave Access (WiMAX) communication protocol, a High Speed Packet Access Plus (HSPA+) communication protocol, or a WiFI protocol (e.g., the Institute of Electrical and Electronics Engineers (IEEE) 802.11n protocol or the 802.11ac protocol), etc. A MIMO communication protocol may use multiple antennas to communicate data between two communication devices (e.g., between the user device 104 and a communication tower such as a NodeB or a base station). The multiple antennas may be used to establish multiple communication links (e.g., communication channels or information streams) between the communication devices. The multiple antennas may be used to increase the amount of data communicated between the communication devices or to improve the performance of the communication links. In another embodiment, wireless communication system 110 may be a wireless fidelity (WiFi) hotspot connected with the network 106. For example, the wireless communication system 110 may use an 802.11a, 802.11b, 802.11c, 802.11g, 802.11n, or 802.11ac communication protocol. In a further embodiment, the wireless communication system 110 may use any number or combination of wireless communication protocols. Wireless communication system 110 may also be a wireless carrier system that can be implemented using various data processing equipment, communication towers, etc. Alternatively, or in addition, the wireless carrier system may rely on satellite technology to exchange information with the user devices 102, 104.

The communication infrastructure may also include a communication-enabling system 115 that serves as an intermediary in passing information between the digital content providing system 120 and the wireless communication system 110. The communication-enabling system 115 may communicate with the wireless communication system 110 (e.g., a wireless carrier) via a dedicated channel, and may communicate with the digital content providing system 120 via a non-dedicated communication mechanism, (e.g., a public Wide Area Network (WAN) such as the Internet).

In addition to wirelessly connecting to wireless communication system 110, user devices 102, 104 may also wirelessly connect to other user devices 102, 104. For example, user device 102 may form a wireless ad hoc (peer-to-peer) network with user device 104 using WiFi, Bluetooth, cellular communication protocols (e.g., LTE, HSPA+, etc.) or other wireless communication protocols.

In one embodiment, the user device 104 may include a communication link manager 105. The communication link manager 105 may establish a plurality of communication links between the user device 104 and a base station in the wireless communication system 110 (e.g., a communication tower or a NodeB). The communication link manager 105 may establish the plurality of communication links using a plurality of antennas. In one embodiment, each antenna may be used to establish one communication link. For example, if a user device 104 has five antennas, the communication link manager 105 may establish five communication links, using a different antenna for each communication link. In other embodiments, the communication link manager 105 may establish more than one communication link per antenna.

In another embodiment, the communication link manager 105 may determine whether one or more communication link criteria (e.g., criteria used to determine whether a communication link should be modified or reconfigured) are satisfied. For example, the communication link manager 105 may determine the power level of a power source (e.g., the battery level of a battery) in the user device 104. In another example, the communication link manager 105 may determine the speed of a processing device (e.g., a central processing unit (CPU) on the user device 104) and may reconfigure one or more communication links based on the speed of the processing device. In a further example, the communication link manager 105 may determine whether one or more applications are executing on the user device 104 and may reconfigure one or more communication links based on which applications are executing on the user device 104. In yet another example, the communication link manager 105 may analyze the orientation or position of the user device 104 to determine whether one or more of the communication links should be modified or reconfigured. Other examples of communication link criteria may include, but not are not limited to, the motion or speed (e.g., movement speed) at which the user device 104 is moving (e.g., the user device 104 may be in a vehicle or held by a user who is moving at a certain speed, such as 50 miles per hour), a transmit power level of the user device 104 (e.g., the power level of a radio signal transmitted by the user device 104), the proximity of the user device 104 to the user (e.g., proximity to the user's face, skin, etc.), the environment where the user device 104 is operating (e.g., whether the user device 104 is operating in an urban area, within a building, in a downtown area with large buildings, in a mountainous area, etc.), and a temperature of the user device 104. In other embodiments, the communication criteria may include any criteria which may be used to determine whether a communication link should be modified or reconfigured.

In one embodiment, the communication link manager 105 may send a measurement message to a base station (e.g., a NodeB or a communication tower). The measurement message may include measurement data (e.g., data associated with the state or condition of one or more communication links). In one embodiment, the measurement data may be information, such as channel state information (CSI), which indicates the conditions of the one or more communication links. In one embodiment, the measurement data which is included in the measurement message may not be indicative of the actual conditions of the one or more communication links (e.g., the measurement data may be "dummy" or "fake" data, or may not be indicative of measured radio conditions for one or more of the communication links). For example, although there may be low noise on a communication link, the communication link manager 105 may send a measurement message with measurement data indicating that there is a higher amount of noise on the communication link. In a further embodiment, the measurement data may be indicative of the actual condition or state of the one or more communication links. This measurement message may cause the base station to reconfigure or modify the communication link by decreasing the amount of data sent over the communication link or by terminating the communication link. In another example, although the quality of reception on a communication link may be low, the communication link manager 105 may send a measurement message including measurement data indicating that the quality of reception on the communication link is higher. This measurement message may cause the base station to modify or reconfigure the communication link by terminating a communication link or by creating new communication links. In one embodiment, a communication link may be reconfigured or modified by change the amount of data transmitted or receive using the communication link (e.g., by changing the bandwidth of a communication link).

In one embodiment, the communication link manager 105 may send a measurement message indicating that a communication link should be modified or reconfigured. For example, the measurement message may contain data indicating that the user device 104 is requesting that a communication link be terminated (e.g., rather than containing "fake" or "dummy" measurement data). In another example, the measurement message may indicate that the user device 104 is explicitly requesting that extra communication links be established or the message may indicate that the user device 104 is explicitly requesting a change in the bandwidth for a communication link.

Figure 2:
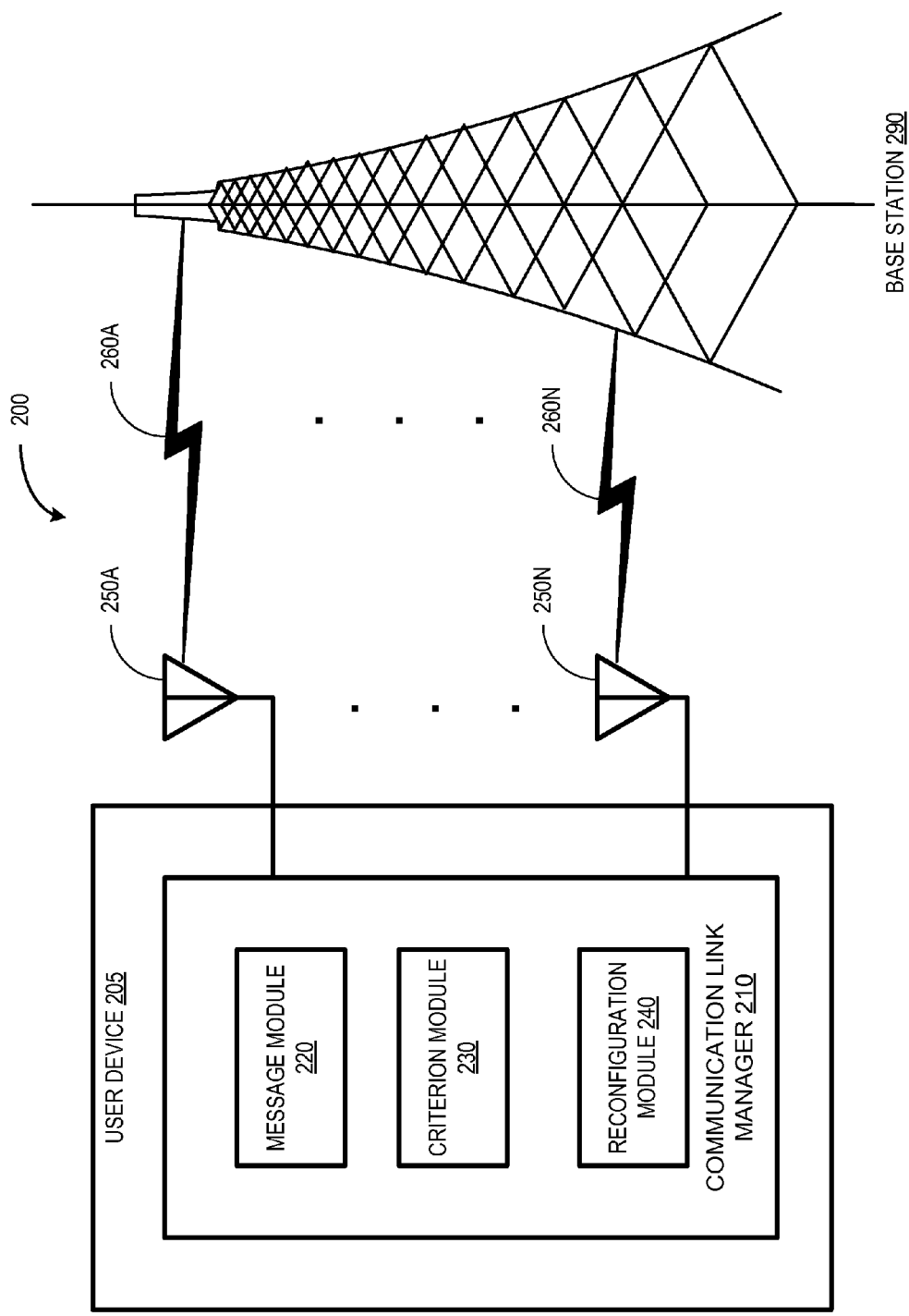
FIG. 2 is a block diagram of a second exemplary network architecture, in which embodiments of the present invention may operate.

FIG. 2 is a block diagram of a second exemplary network architecture 200, in which embodiments of the present invention may operate. The network architecture 200 includes a user device 205 and a base station 290. The user device 205 includes a communication manager 210. The communication manager 210 includes a message module 220, a criterion module 230, and a reconfiguration module 240. The user device 205 also includes a plurality of antennas 250A to 250N. Each antenna 250A to 250N may establish a corresponding communication link 260A to 260N, with the base station 290.

In one embodiment, different streams of data or information may be transmitted between the user device 205 and the base station 290 using one or more of the communication links 260A to 260N. For example, the base station 290 may transmit an electronic media item (provided by a content providing server) to the user device 205 using the communication links 260A to 260N. The electronic media item may be divided into portions and each portion may be transmitted using one of the communication links 260A to 260N. In another example, the base station 290 may transmit multiple electronic media items to the user device 250 using the communication links 260A to 260N. Each communication link 260A to 260N may be used to transmit an electronic media item. It should be understood that the multiple information streams (e.g., the digital media items, files, or other data) may be divided among the communication links 260A to 260N in any number of combinations.

As discussed above, the communication link manager 210 may determine that one or more of the communication links 260A to 260N should be reconfigured, based on one or more communication link criteria. The criterion module 230 may determine whether the one or more communication link criteria are satisfied and whether one or more of the communication links 260A to 260N should be modified or reconfigured.

In one embodiment, the communication link criteria may include criteria which are used to determine whether one or more communication links should be reconfigured. For example, one communication link criteria may be a battery power level of the user device 205. If the battery power level of the user device 205 drops below a certain level (e.g., below 20%), the criterion module 230 may determine that a communication link criterion has been satisfied. Based on this criterion, the communication link manager 200 may terminate or decrease the bandwidth (e.g., the data capacity or throughput) of one or more of the communication links 260A to 260N to save battery power (e.g., change the throughput from 2 megabits per second to 1 megabit per second). In another example, a communication link criteria may be whether the user device 205 is plugged into a power source (e.g., connected to a power adaptor). If the user device 205 is plugged into a power source, the criterion module 230 may determine that the user device 205 has enough power to support the use of more communication links. If the user device is not plugged into a power source, the criterion module 230 may determine that the user device 205 should use few communication links to save or conserve battery power. In a further example, if the temperature of the user device 205 exceeds a certain threshold (e.g., 80° Fahrenheit), the communication link manager 210 may terminate or decrease the bandwidth of one or more of the communication links 260A to 260N. In yet another example, if the user device 205 is within a certain distance of the user (e.g., within an inch of the user's face or skin), the communication link manager 210 may terminate or decrease the bandwidth of one or more of the communication links 260A to 260N.

Another example, of a communication criterion may be the speed of a processing device of the user device 205. If the speed of the processing device (e.g., the processing speed) is above a certain threshold (e.g., above 1 GHz), the criterion module 230 may determine that one or more of the communication links 260A to 260N should be terminated. If the speed of the processing device (e.g., the processing speed) is below a certain threshold (e.g., below 1 GHz), the criterion module 230 may determine that more communication links should be established. A further example of a communication criterion may be the types of applications which are executing on the user device 205. If certain types of applications are executing on the user device (e.g., preferred applications), the criterion module 230 may determine that more communication links are needed to provide data for the preferred applications. If no preferred applications are running, the criterion module 230 may determine that one or more of the communication links 260A to 260N should be terminated.

Yet another example of a communication link criterion may be the orientation of the user device 205 or the proximity of the user device 205 to a user. If the user device 205 is in close proximity (e.g., within a certain distance) to a user (e.g., the user device 205 is a smart phone and the user is holding the smart phone up to the user's ear), the criterion module 230 may determine that one or more of the communication links 260A to 260N should be terminated in order reduce the amount of energy is absorbed by the user's body due to the radio frequency (RF) electromagnetic field caused by the one or more antennas 250A to 250N.

It should be understood that in other embodiments, the criterion module 230 could evaluate whether any number or type of criteria are satisfied and determine how and whether one or more of the communication links 260A to 260N should be modified or reconfigured.

The message module 220 may generate a measurement message containing measurement data, based on the data received from the criterion module 230. For example, if the criterion module 230 determines that a communication link criterion has been met (e.g., battery power is less than 20%), the message module 220 may generate a measurement message based on this determination. In one embodiment, the message module 220 generates a measurement message with measurement data which is not indicative of actual channel state or conditions experienced by the user device 205 (e.g., incorrect data or information, or not indicative of radio conditions measured by the user device 205). For example, although the channel conditions may be adequate to support four communication links between the user device 205 and the base station 290, the criterion module 230 may determine that battery power is below a certain threshold. Based on this determination, the message module 220 may generate a measurement message with measurement data indicating that the conditions of the four communications links are worse than they actually are (e.g., measurement data may indicate that only two communication links can be supported). In one embodiment, the message module 220 is also capable of generating a measurement message with measurement data which is indicative of actual channel state or conditions experienced by the user device 205 (e.g., indicative of radio conditions measured by the user device). For example, the if the battery power level of the user device 205 exceeds a certain threshold (e.g., is no greater than 20%), the measurement module 220 may no longer generate measurement messages to fake measurement data, but may start generating measurement messages with measurement data which accurately reflects the condition or state of one or more of the communication links.

In one embodiment, the message module 220 may generate measurement data which includes parameters or information used by the communication protocol to determine the state or condition of a communication link. For example, the LTE communication protocol may use different types of information (e.g., channel state information (CSI)) to indicate the state or condition of a communication link. The LTE communication protocol may use one or more of a channel quality indicator (CQI), a pre-coding matrix indicator, (PMI) and a rank indicator (RI) to reflect the CSI experienced on a communication link 260A to 260N. One or more of the CQI, PMI, and RI may be sent to the base station 290 using a measurement message (e.g., a feedback report).

In one embodiment CQI may be an index value. The index value may be used to index into a table of values for parameters (e.g., coding or modulation scheme, and rate matching) which may be used to reconfigure or modify the communication link. For example, the index value "5" may be mapped a quadrature phase-shift keying (QPSK) modulation scheme and a rate matching value of 440.

In one embodiment, the CQI may be calculated based on the amount of noise or interference that is experienced by the user device 200 on a communication link. For example, the CQI may be calculated based on strength of a pilot signal (e.g., a reference signal) transmitted by the base station 290. In another embodiment, the CQI may be a calculated based on the amount of errors in the data which is received via the communication link. For example, a CQI value may be calculated based on a block error rate (which indicates the number of errors in the blocks or units of data) in blocks of data received from the base station 290. In one embodiment, the CQI may be computed for each codeword (e.g., for each block or unit of data) when the user devices transmits or receives data using spatial multiplexing (e.g., transmits different streams of information simultaneously using different antennas). In another embodiment, the CQI may also be a wide-band CQI (e.g., CQI for all radio frequencies or bands used by an antenna) or sub-band CQI (e.g., CQI for a sub-band or sub-group of all the frequencies or bands used by an antenna).

In one embodiment, the message module 220 may generate a CQI value which is not indicative of the actual conditions for one of the communication links 260A to 260N. For example, the CQI value for the communication link 260A based on the actual conditions (e.g., measured or actual radio frequency (RF) conditions, measured or actual noise, measured or actual block error rate, etc.) of the communication link 260A may be the index value 13. However, the message module 220 may generate a CQI value of 4, in order to cause the base station 290 to initiate reconfiguration or modification of the communication link 260A (e.g., to terminate the communication link).

In one embodiment, the pre-coding matrix indicator (PMI) is also an index value. The pre-coding matrix indicator may be used to index into a table or codebook which contains different pre-coding matrices which may be used to send or receive data on a communication link. Each index value maps to a different pre-coding matrix within the table or codebook. The pre-coding matrix indicator may be used to determine which pre-coding matrix should be used for a communication link.

In one embodiment, the message module 220 may generate a PMI value which is not indicative of the actual conditions for one of the communication links 260A to 260N. For example, the PMI value for the communication link 260A based on the actual conditions (e.g., radio frequency (RF) conditions, noise, block error rate, etc.) of the communication link 260A may be the index value 12. However, the message module 220 may generate a PMI value of 2, in order to cause the base station 290 to initiate reconfiguration or modification of the communication link 260A.

In one embodiment, the rank indicator (RI) is an indication of the number of transmission layers (e.g., the number of information streams) that may be transmitted using the communication links 260A to 260N. The RI may be represented using one or more bits (e.g., a single bit, two bits, etc.), which may be used to determine how many transmission layers may be used. For example, the bit pattern "0" may correspond to an RI of 1, indicating that 1 transmission layer may be used. In another example, the bit pattern "10" may correspond to an RI of 3, indicating that 3 transmission layers may be used.

In one embodiment, the message module 220 may generate a bit pattern corresponding to an RI value which is not indicative of the actual conditions for one of the communication links 260A to 260N. For example, the RI value for the communication link 260A based on the actual conditions (e.g., radio frequency (RF) conditions, noise, block error rate, etc.) of the communication link 260A may be the RI value 3 (e.g., the bit pattern "10"). However, the message module 220 may generate a bit pattern "00" to indicate a RI value of 1, in order to cause the base station 290 to initiate reconfiguration or modification of the communication link 260A.

In one embodiment, the message module 220 may send the CQI, PMI, and RI values using one or more measurement messages (e.g., one or more feedback messages). For example, the CQI, PMI and RI values may be sent (as measurement data) in a single measurement message. In another example, the CQI and PMI values may be sent in one measurement message and the RI value may be sent in another measurement message. In a further example, each of the CQI, PMI, and RI values may be sent using a corresponding measurement message. It should be understood that the CQI, PMI and RI values may be transmitted to the base station 290 using any number of measurement messages.

In another embodiment, the message module 220 may use one or more of the CQI, PMI and RI values within the measurement messages. For example, the message module 220 may only generate CQI values in measurement messages, or may only generate RI values in measurement messages. In another example, the message module 220 may only generate CQI and PMI values in measurement messages. It should be understood that any combination of CQI, PMI, and RI values may be used in the measurement messages.

Although the embodiments described herein refer to CQI, PMI, and RI values (which are used in the LTE communication protocol), it should be understood that in other embodiments, different types of values may be used for different types of communication protocols. For example, the message module 220 may generate a measurement message (e.g., a feedback report or measurement report) which contains signal to noise (SNR) values. In another example, the message module 220 may generate a measurement message which indicates whether the user device 205 is experiencing noise on one or more of the communication links 260A to 260N (e.g., indicates the amount or level of noise on a communication link). In a further example, the message module 220 may generate a measurement message which contains a block error rate value or a value indicating the strength of a pilot or reference channel. Other communication protocols (e.g., WiMAX, HSPA+, etc.) may use different types of values for measurement data. In one embodiment, the message module 220 may generate any type of value used to indicate the state or condition of a communication link, based on the communication protocol used by the communication link.

In one embodiment, one or more of the measurement messages generated by the report module 220 may be transmitted to the base station 290. Based on the one or more measurement messages, the base station 290 may initiate the reconfiguration or modification of the communication links 260A to 260N. For example, the base station 290 may cause one of the communication links to be terminated. In another example, the base station 290 may cause a new communication link to be established. In one embodiment, the base station 290 may cause the reconfiguration or modification of a communication link by sending the user device 200 a reconfiguration message.

The reconfiguration module 240 may receive the reconfiguration message, and may modify or reconfigure one or more of the communication links 260A to 260N, based on the reconfiguration message. For example, the reconfiguration message may indicate that the communication link 260A should be terminated at a certain time. Based on the reconfiguration message, the reconfiguration module 240 may terminate the communication link 260A at the specified time. In another example, the reconfiguration message may indicate that a new communication link should be established and may indicate a radio frequency to use for the new communication link and a specific time to establish the new communication link. Based on the reconfiguration message, the reconfiguration module 240 may establish a new communication link using the radio frequency specified in the reconfiguration message and at the time specified in the reconfiguration message. In a further example, the reconfiguration message may indicate that the bandwidth for a communication link should be changed (e.g., the bandwidth should be increased or decreased). In one embodiment, the reconfiguration message may be any type of packet, frame, or message which the user device 205 may use to reconfigure or terminate one or more communication links. For example, the reconfiguration message may be layer 1 message (e.g., a physical layer message), a layer 2 message (e.g., a medium access control (MAC) layer message), a layer 3 message (e.g., a radio link control (RLC) message), or another type of message (e.g., a radio resource control (RRC) message).

Figure 3:
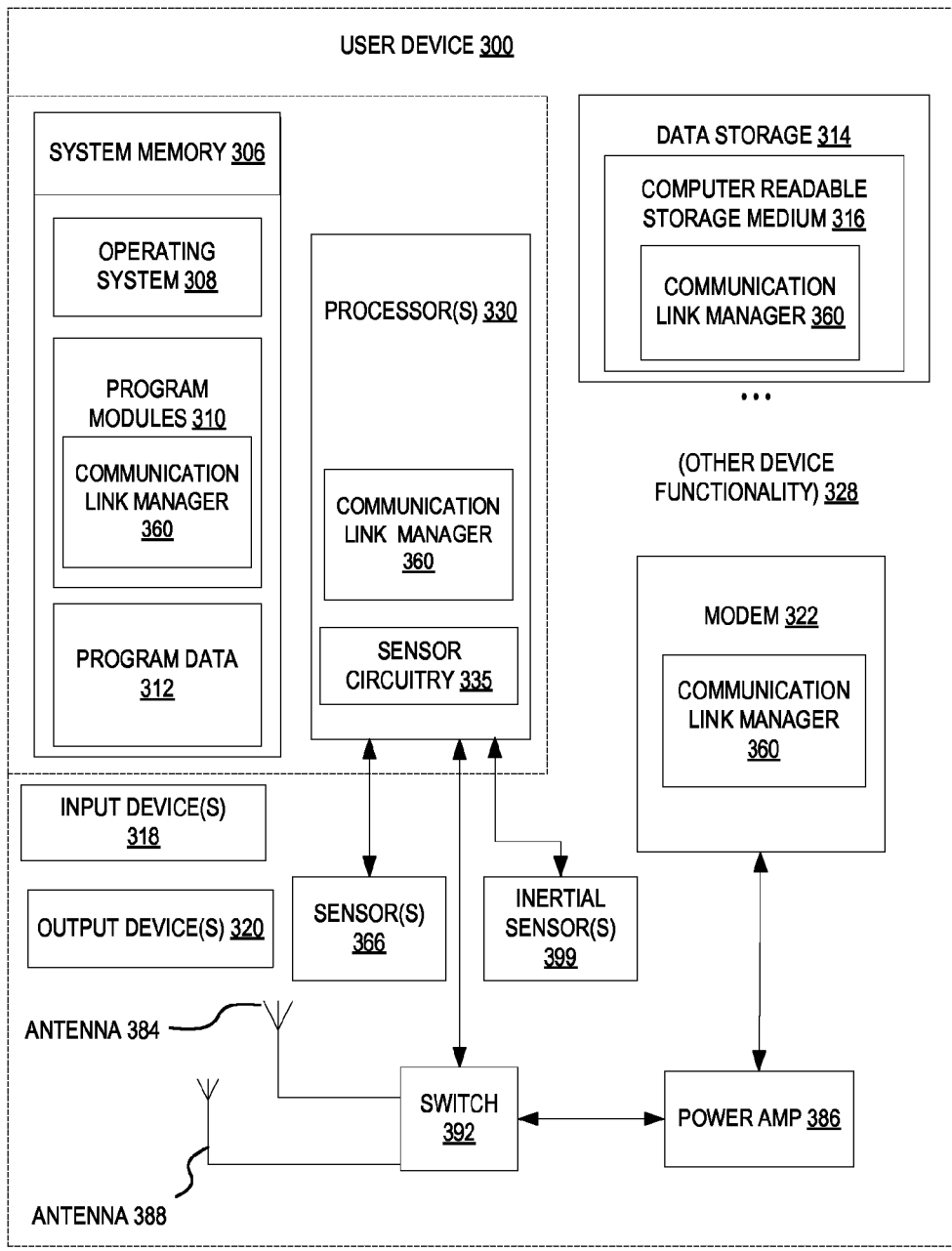
FIG. 3 is a block diagram illustrating an exemplary user device, according to one embodiment.

FIG. 3 is a block diagram illustrating an exemplary user device 300, according to one embodiment. The user device 300 may correspond to the user device 104 of FIG. 1 and may be any type of computing device such as an electronic book reader, a PDA, a mobile phone, a laptop computer, a portable media player, a tablet computer, a smart phone, a camera, a video camera, a netbook, a desktop computer, a gaming console, a DVD player, a computing pad, a media center, and the like.

The user device 300 includes one or more processors 330, such as one or more CPUs, microcontrollers, field programmable gate arrays, or other types of processors. The user device 300 also includes system memory 306, which may correspond to any combination of volatile and/or non-volatile storage mechanisms. The system memory 306 may include one or more of read-only memory (ROM), flash memory, dynamic random access memory (DRAM) such as synchronous DRAM (SDRAM)), and static random access memory (SRAM)). The system memory 306 stores information which provides an operating system component 308, various program modules 310 such as communication link manager 360, program data 312, and/or other components. The user device 300 performs functions by using the processor(s) 330 to execute instructions provided by the system memory 306.

The user device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the communication link manager 360 may reside, completely or at least partially, within the computer readable storage medium 316, system memory 306 and/or within the processor(s) 330 during execution thereof by the user device 300, the system memory 306 and the processor(s) 330 also constituting computer-readable media. The user device 300 may also include one or more input devices 318 (keyboard, mouse device, specialized selection keys, etc.) and one or more output devices 320 (displays, printers, audio output mechanisms, etc.). In one embodiment, the input devices 318 and the output devices 320 may be combined into a single device (e.g., a touch screen).

The user device 300 further includes a wireless modem 322 to allow the user device 300 to communicate via a wireless network (e.g., such as provided by the wireless communication system) with other computing devices, such as remote computers, the item providing system, and so forth. The wireless modem 322 allows the user device 300 to handle both voice and non-voice communications (such as communications for text messages, multimedia messages, media downloads, web browsing, etc.) with the wireless communication system 110. The wireless modem 322 may also allow the user device 300 to handle other signaling data to facilitate communication of the voice and non-voice data between the user device 300 and the wireless communication system 110. The wireless modem 322 may provide network connectivity using any type of mobile network technology including, for example, cellular digital packet data (CDPD), GPRS, EDGE, universal mobile telecommunications system (UMTS), 1 times radio transmission technology (1xRTT), evaluation data optimized (EVDO), high-speed down-link packet access (HSDPA), WiFi, HSPA+, WiMAX, Long Term Evolution (LTE) and LTE Advanced (sometimes generally referred to as 4G), etc. In one embodiment, the wireless modem includes the communication link manager 360 in addition to, or instead of, the communication link manager 360 being included in the computer readable storage medium 316, system memory 306 and/or processor(s) 330. The communication link manager 360 may be implemented as hardware, firmware and/or software of the wireless modem 322. It should be noted that the modem 322 may include a processing component that performs various operations to handle both voice and non-voice communications. This processing component can execute the communication link manager 360. Alternatively, the communication link manager 360 can be executed by a processing component of the user device, such as the processor 330 or other types of processing device as would be appreciated by one of ordinary skill in the art having the benefit of this disclosure.

The wireless modem 322 may generate signals and send these signals to power amplifier (amp) 380 for amplification, after which they are wirelessly transmitted via antenna 384 or antenna 388. A switch 392 is coupled between the power amp 380 and the two antennas 384, 388. In one embodiment, the switch 382 is controlled by the processor(s) 330. In another embodiment, the switch 392 is controlled by the wireless modem 322. The antennas 384, 388 may be directional, omni-directional or non-directional antennas. In addition to sending data, antennas 384, 388 can be deployed to receive data, which is sent to wireless modem 322 and transferred to processor(s) 330. In one embodiment, the antennas 384, 388 may be used to form communication links between the user device 300 and a base station (e.g., a NodeB or a cell tower).

Though a single modem 322 is shown to control transmission to both antennas 384 and 388, the user device 300 may alternatively include multiple wireless modems. In one embodiment, each modem includes an independent communication link manager 360. Alternatively, a single communication link manager (e.g., that is included in system memory 306, processor 330 and/or data storage 314) may reconfigure or modify the communication links. In addition, the user device 300, while illustrated with two antennas 384, 388, may include more than two antennas in various embodiments.

The processor(s) 330 and the modem 322 may be a general-purpose processing devices such as a microprocessor, central processing unit, or the like. More particularly, the processor(s) 330 and the modem 322 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor(s) 330 and the modem 322 may also be one or more special-purpose processing devices such as an application specific integrated circuit (ASIC), a field programmable gate array (FPGA), a digital signal processor (DSP), network processor, or the like.

In one embodiment, user device 300 includes one or more sensors 366 such as a physical contact sensor or close proximity sensors. The sensors 366 can detect the human body parts proximate to the user device, and convey information regarding the detection to processor(s) 330. In one embodiment, the sensors 366 may be capacitive sensors that are configured to measure capacitance generated by the human body part proximate to the user device using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 366 may also be optical (e.g., infrared) sensors that use an emitter and receiver pair to detect the presence of opaque objects. Alternatively, the sensors 366 may be inductive sensors, which include an inductive loop. When the presence of a human body part (or metal object) is brought close to the inductive sensor, an induction of the inductive loop changes, causing the human body part to be detected. Alternatively, the sensors 366 may be ultrasonic sensors that emit an ultrasonic signal and measure a time duration between when a signal is transmitted and the reflection of that signal received (a.k.a., flight response). The sensors 366 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. It should also be noted that the sensors 366 may be used to determine a distance between one or more of the antennas and the detected human body part. Though the detected object is described herein as a human body part, other types of objects may also be detected depending on the sensing technologies used.

In one embodiment, user device 300 includes one or more inertial sensors 399. The inertial sensors 399 can be used to detect motion of the user device 300. In one embodiment, the inertial sensors 399 detect linear accelerations (translational movement) and angular accelerations (rotational movement). The inertial sensors 399 may include accelerometers and/or gyroscopes. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The inertial sensors 399 in one embodiment are micro-electromechanical systems (MEMS) sensors.

In one embodiment, the motion data from the one or more inertial sensors 399 may be used to determine an orientation of the user device 300 to determine if a communication link criterion is satisfied (e.g., whether the user device 300 is in proximity to a user's body). In another embodiment, the sensor data from the one or more sensors 366 may be used to determine an orientation of the user device 300 for to determine if a communication link criterion is satisfied. In a further embodiment, of the motion data and the sensor data may be used to determine whether a communication link criterion is satisfied.

The processor(s) 330 may include sensor circuitry 335 (e.g., sensor device drivers) that enables the processor(s) 330 to interpret signals received from the sensor(s) 366 and/or inertial sensors 399. In one embodiment, the sensors 366 and/or inertial sensors 399 output fully processed signals to the processor(s) 330. For example, the sensors 366 may output a distance, a detected/not detected signal, etc. using a single line interface or a multi-line interface. Similarly, inertial sensors 399 may output an acceleration value (e.g., in Gs). In another embodiment, the sensors 366 output, for example, positional data and/or object presence data (e.g., of a human body part) to the processors 330 without first processing the data. Similarly, inertial sensors 399 may output, for example, voltage values that can be interpreted as acceleration values. In either instance, the processors 330 may use the sensor circuitry 335 to process and/or interpret the received data. If data is received from multiple sensors 366 and/or inertial sensors 399, processing the data may include averaging the data, identifying a maximum from the data, or otherwise combining the data from the multiple sensors. In one embodiment, in which the sensors 366 include a sensor array, numerous sensors, or a touch panel, processing the data includes determining where on the user device the human body part is located from multiple sensor readings.

In one embodiment, processor 330 controls whether the switch provides an electrical connection between the power amp 386 and the antenna 388. For example, if a communication link criterion is satisfied (e.g., batter level is below a certain threshold or the user device 300 is within a certain distance from a user's body) and the processor 330 determines that one or more communication links should be reconfigured or modified, the switch 392 may terminate the electrical connection between the power amp 386 and the antenna 388 (e.g., may terminate a communication link). Alternatively, or in addition, modem 322 may control the switch.

Figure 4:
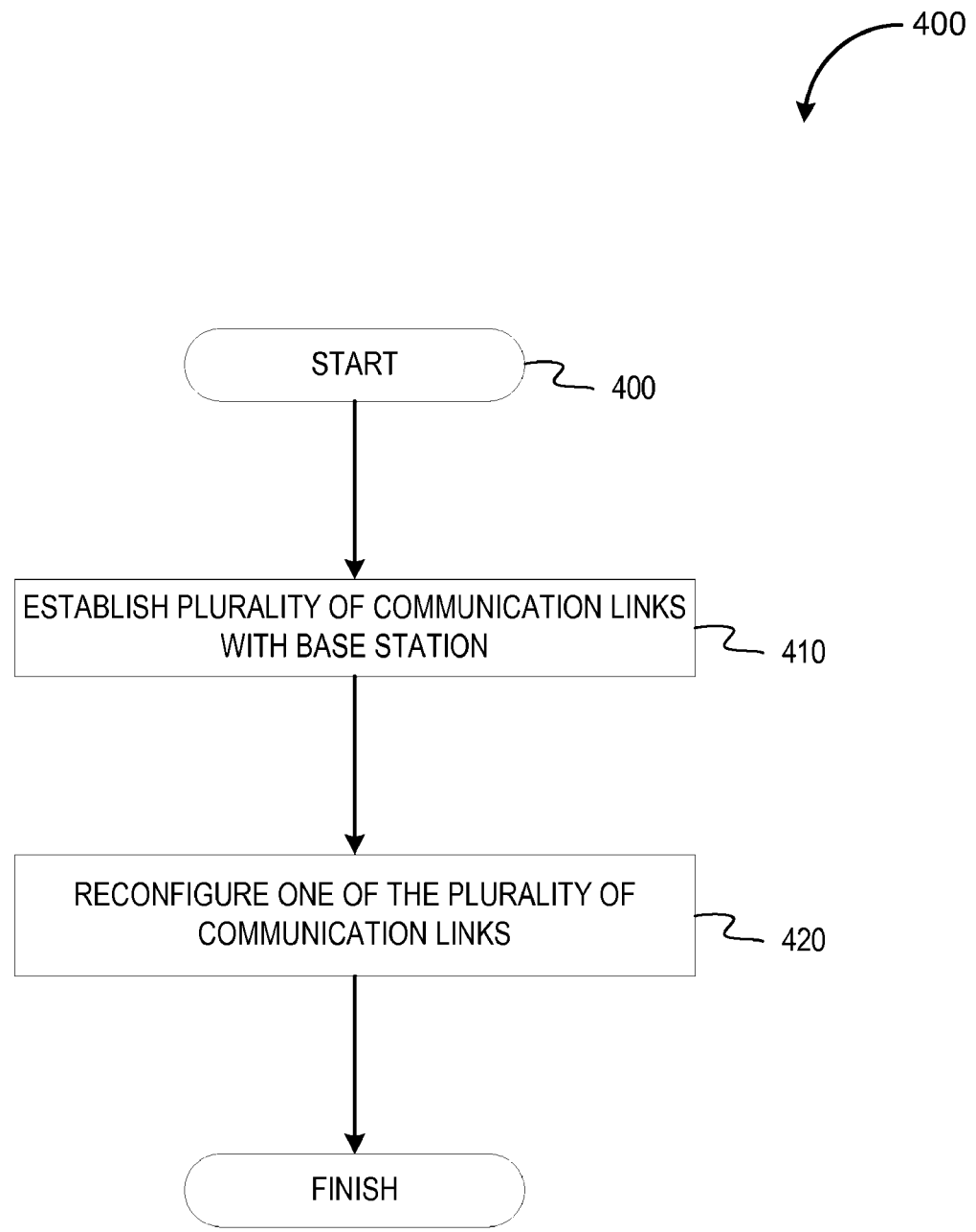
FIG. 4 is a flow diagram illustrating a method for reconfiguring one or more communication links, according to an embodiment.

FIG. 4 is a flow diagram illustrating a method for reconfiguring one or more communication links, according to an embodiment. The method 400 may be performed by processing logic that comprises hardware (e.g., circuitry, dedicated logic, programmable logic, microcode, etc.), software (e.g., instructions run on a processor to perform hardware simulation), or a combination thereof. The processing logic is configured to generate reconfigure or modify one or more communication links. In one embodiment, method 400 may be performed by a communication link manager, as shown in FIGS. 1, 2, and 3.

Referring to FIG. 4, at block 410, the method 400 establishes a plurality of communication links with a base station. As discussed above, a plurality of antennas may be used to establish the plurality of communication links. The method 400 then causes one or more of the plurality of communication links to be reconfigured or modified at block 420. For example, the method 400 may evaluate whether one or more communication link criteria are met, and may send a measurement message to cause the base station to reconfigure or modify the link.

Figure 5:
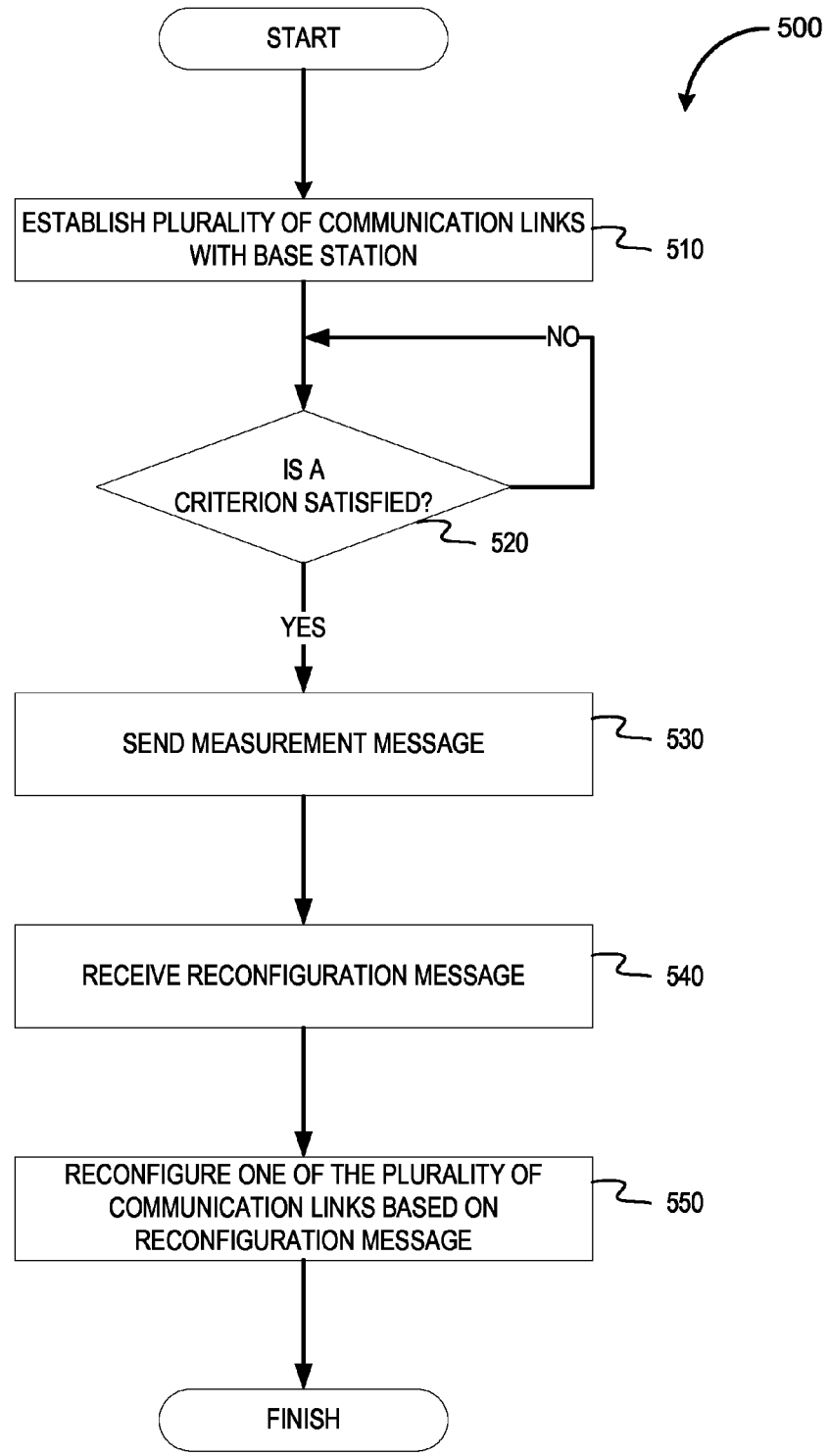
FIG. 5 is a flow diagram illustrating a method for reconfiguring one or more communication links, according to another embodiment.

FIG. 5 is a flow diagram illustrating a method for reconfiguring one or more communication links, according to another embodiment. The method 500 may be performed by processing logic that comprises hardware (e.g., circuitry, dedicated logic, programmable logic, microcode, etc.), software (e.g., instructions run on a processor to perform hardware simulation), or a combination thereof. The processing logic is configured to generate reconfigure or modify one or more communication links. In one embodiment, method 500 may be performed by a communication link manager, as shown in FIGS. 1, 2, and 3.

Referring back to FIG. 5, at block 510, the method 500 establishes a plurality of communication links with a base station. The method 500 evaluates whether a criterion (e.g., a communication link criterion such as a threshold battery level) or multiple criteria are satisfied at block 520. In no criterion is satisfied, the method 500 proceeds back to block 520. In one embodiment, the method 500 may periodically check whether a criterion is satisfied (e.g., may perform block 520 every 500 milliseconds or every second). If a criterion (or multiple criteria) is satisfied, the method 500 proceeds to block 530, where the method 500 generates and sends a measurement message. As discussed above, the measurement message may contain measurement data (e.g., CQI, PMI, RI, and other values).

In one embodiment, the measurement data may not be indicative of the actual condition or state of the plurality of communication links (e.g., the measurement data may contain fake or inaccurate measurement information). In another embodiment, the measurement message may contain an explicit request to reconfigure one or more of the plurality of communication links. For example, the communication protocol used by the one or more communication links may allow a user device to request reconfiguration or modification of communication links (e.g., to terminate or to establish communication links).

The method 500 receives a reconfiguration message from the base station at block 540. The reconfiguration message may contain information such as the time at which a communication link should be reconfigured (e.g., terminated or established) or the frequency to use for a new communication link. The method 500 reconfigures or modifies one of the plurality of communication links based on the reconfiguration message at block 550.

Figure 6:
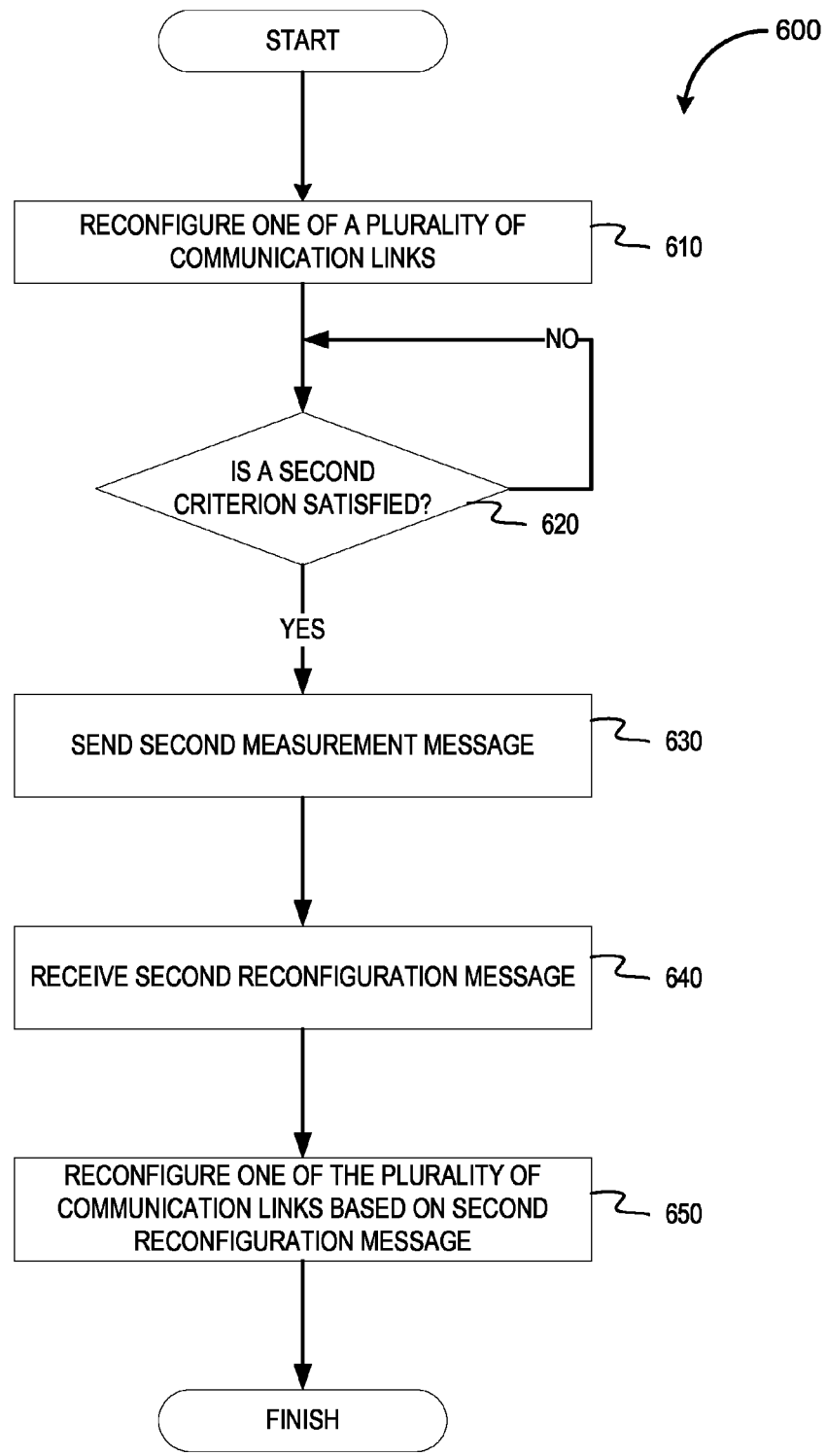
FIG. 6 is a flow diagram illustrating a method for reconfiguring one or more communication links, according to a further embodiment.

FIG. 6 is a flow diagram illustrating a method for reconfiguring one or more communication links, according to a further embodiment. The method 600 may be performed by processing logic that comprises hardware (e.g., circuitry, dedicated logic, programmable logic, microcode, etc.), software (e.g., instructions run on a processor to perform hardware simulation), or a combination thereof. The processing logic is configured to generate reconfigure or modify one or more communication links. In one embodiment, method 600 may be performed by a communication link manager, as shown in FIGS. 1, 2, and 3. In one embodiment, the method 600 may be performed after one or more of the communication links have been previously reconfigured. For example, the method 600 may be performed after block 550 of FIG. 5.

Referring to FIG. 6, the method 600 starts at block 610, where one of a plurality of communication links is reconfigured. The communication link may be reconfigured because a first criterion (e.g., a first communication link criterion) was satisfied (e.g., a communication link may have been terminated because the battery power level is below 20%). At block 620, the method 600 determines if a second criterion (e.g., a second communication link criterion) is satisfied. If no criteria are satisfied, the method 600 proceeds back to block 620. In one embodiment, the method 600 may periodically check whether a criterion is satisfied (e.g., may perform block 620 every 500 milliseconds).

If a second criterion is satisfied, the method 600 proceeds to block 630, where the method 630 generates and sends a measurement message. As discussed above, the measurement message may contain measurement data (e.g., CQI, PMI, RI, and other values). In one embodiment, the measurement message may contain measurement data which is indicative of the actual condition or state of one or more communication links. In another embodiment, the measurement message may contain measurement data which is not indicative of the actual condition or state of one or more communication links. At block 640, the method 600 receives a second reconfiguration message from the base station. Based on the second reconfiguration message, the method 600 reconfigures the one of the plurality of communication links at block 650.

Figure 7:
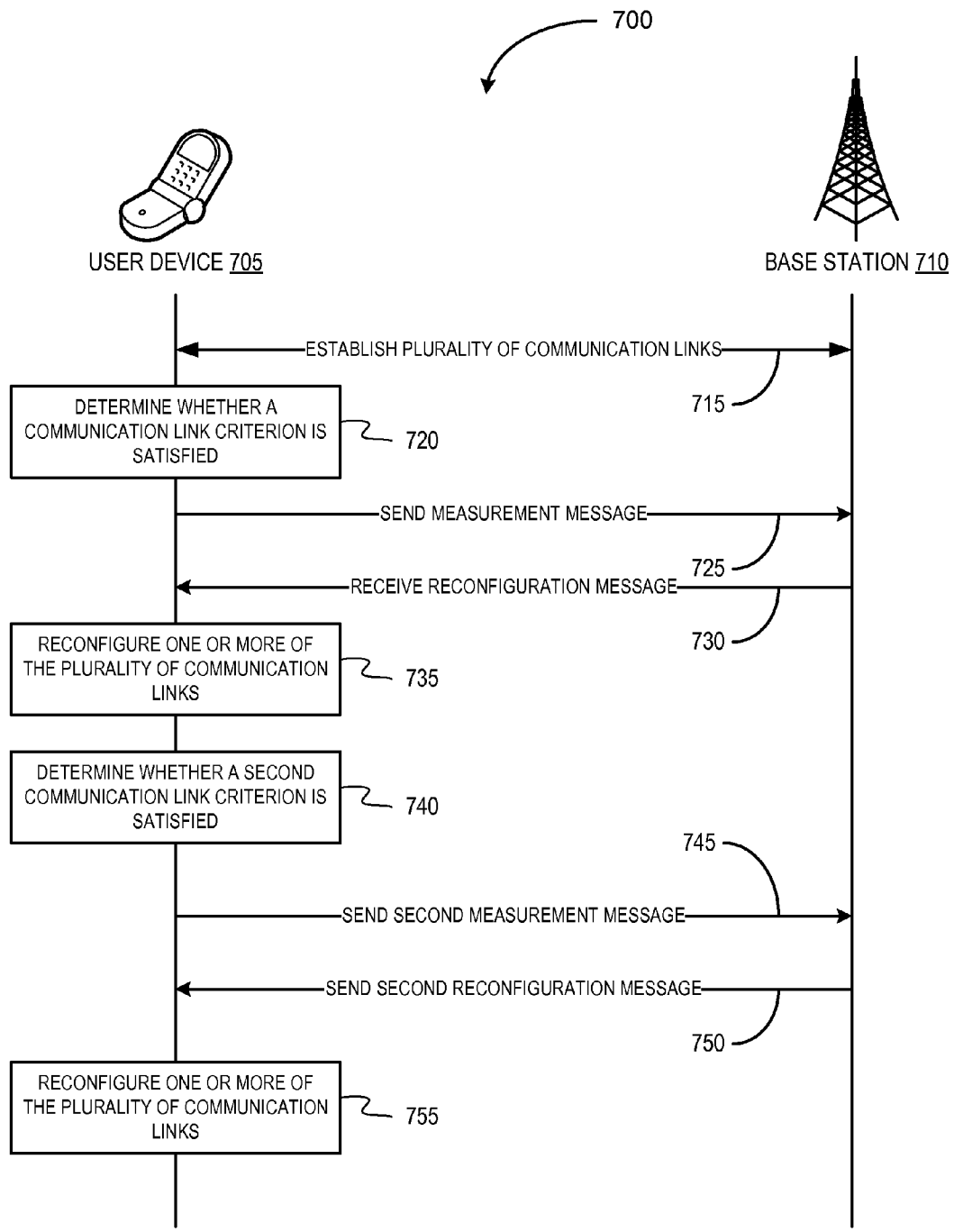
FIG. 7 is a timing diagram illustrating the timing of communications and actions performed by a user device and a base station, according to one embodiment.

FIG. 7 is a timing diagram 700 illustrating the timing of communications and actions performed by a user device 705 and a base station 710, according to one embodiment. At time 715, the user device 705 and the base station 710 establish a plurality of communication links. At time 720, the user device 705 determines whether a communication link criterion is satisfied (e.g., whether a user is in close proximity to the user device 705 or whether a preferred application is executing). If the communication link criterion is satisfied, the user device 705 generates and sends a measurement message to the base station 710 at time 725. As discussed above, the measurement message may include measurement data which is not indicative of the actual conditions or states of the plurality of communication links. At time 730, the base station 710 sends a reconfiguration message based on the measurement message received from the user device 705. The user device 705 reconfigures one or more of the plurality of communication links based on the reconfiguration message at time 735.

At time 740, the user device 705 determines whether a second communication link criterion is satisfied. If a second communication link criterion is satisfied, the user device 705 generates and sends a second measurement message to the base station 710 at time 745. At time 750, the base station 710 sends a reconfiguration message to the user device 705. The user device 705 reconfigures one or more of the plurality of communication links based on the second reconfiguration message at block 755.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "establishing," "determining," "sending," "receiving," "terminating," "reconfiguring," "decreasing," "increasing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    establishing, by a client device, a plurality of multiple-input-multiple-output (MIMO) communication links with a base station;
    determining, by the client device, that the client device satisfies a communication link criterion, wherein the client device satisfies the communication link criterion in response to a battery level of the client device being below a defined status threshold;
    in response to the battery level of the client device being below the defined status threshold, sending, by the client device, a first measurement message to the base station, wherein the first measurement message comprises incorrect measurement data associated with one or more radio conditions for the at least one of the plurality of MIMO communication links;
    in response to sending the first measurement message comprising the incorrect measurement data to the base station, receiving a reconfiguration message from the base station, the reconfiguration message indicating a time at which the at least one of the plurality of MIMO communication links is to be reconfigured;
    reconfiguring the at least one of the plurality of MIMO communication links at the time indicated in the reconfiguration message, wherein the reconfiguring comprises at least one of terminating the at least one of the plurality of MIMO communication links or establishing a new MIMO communication link between the client device and the base station; and
    responsive to determining that the battery level of the client device is above the defined status threshold, sending, by the client device, a second measurement message to the base station, wherein the second measurement message comprises correct measurement data associated with the one or more radio conditions for the at least one of the plurality of MIMO communication links.

2. The method of claim 1, wherein reconfiguring the at least one of the plurality of MIMO communication links comprises:
    decreasing a data capacity of the at least one of the plurality of MIMO communication links.

3. The method of claim 1, wherein determining that the client device satisfies the communication link criterion further comprises determining that the client device satisfies one or more of:
    a threshold for a processing speed of the client device;
    a number of applications executing on the client device;
    a proximity of the client device to a user;
    a movement speed of the client device;
    a transmit power level of the client device;
    an environmental condition where the client device is located; or
    a temperature of the client device.

4. The method of claim 1, wherein sending the first measurement message comprising the incorrect measurement data comprises sending one or more of:
    a channel quality indicator for the at least one of the plurality of MIMO communication links;
    a pre-coding matrix indicator for the at least one of the plurality of MIMO communication links; or
    a rank indicator for the at least one of the plurality of MIMO communication links.

5. The method of claim 1, wherein establishing the plurality of MIMO communication links comprises establishing at least one of:
    Long Term Evolution (LTE) communication links;
    High Speed Packet Access Plus (HSPA+) communication links;
    802.11ac communication links;
    802.11n communication links; or
    Worldwide Interoperability for Microwave Access (WiMAX) communication links.

6. The method of claim 1, further comprising:
    determining, by the client device, whether a second communication link criterion is satisfied; and
    sending, by the client device, a third measurement message to the base station in response to the second communication link criterion being satisfied;
    receiving a second reconfiguration message from the base station; and
    reconfiguring the plurality of MIMO communication links.

7. A system comprising:
    a base station; and
    a client device comprising one or more processing devices to:
        establish, by the client device, a plurality of communication links with the base station;
        determine, by the client device, that the client device satisfies a communication link criterion, wherein the client device satisfies the communication link criterion in response to a battery level of the client device being below a defined status threshold; and
        in response to the battery level of the client device being below the defined status threshold, send, by the client device to the base station, a first measurement message comprising incorrect measurement data, wherein the incorrect measurement data is not indicative of one or more radio conditions for the at least one of the plurality of communication links;
        in response to the first measurement message comprising the incorrect measurement data being sent to the base station, receive a reconfiguration message from the base station, the reconfiguration message indicating a time at which the at least one of the plurality of communication links is to be reconfigured;
        reconfigure the at least one of the plurality of communication links at the time indicated in the reconfiguration message, wherein the reconfiguring comprises at least one of terminating the at least one of the plurality of communication links or establishing a new communication link between the client device and the base station; and
        responsive to determining that the battery level of the client device is above the defined status threshold, send, by the client device, a second measurement message to the base station, wherein the second measurement message comprises correct measurement data indicative of the one or more radio conditions for the at least one of the plurality of communication links.

8. The system of claim 7, wherein to reconfigure the at least one of the plurality of communication links, the one or more processing devices to:

decrease a data capacity of the at least one of the plurality of communication links.

9. The system of claim 7, wherein the plurality of communication links comprises multiple-input-multiple-output (MIMO) communication links.

10. The system of claim 7, wherein the incorrect measurement data comprises one or more of:
   a channel quality indicator for the one of the plurality of communication links;
   a pre-coding matrix indicator for the one of the plurality of communication links; or
   a rank indicator for the one of the plurality of communication links.

11. The system of claim 7, wherein the plurality of communication links comprises at least one of:
   Long Term Evolution (LTE) communication links;
   High Speed Packet Access Plus (HSPA+) communication links;
   802.11ac communication links;
   802.11n communication links; or
   Worldwide Interoperability for Microwave Access (WiMAX) communication links.

12. The system of claim 7, wherein the one or more processing devices further to:
   determine whether a second communication link criterion is satisfied;
   send a third measurement message to the base station in response to the second communication link criterion being satisfied;
   receive a second reconfiguration message from the base station; and
   reconfigure the one of the plurality of communication links.

13. The system of claim 7, wherein the communication link criterion further comprises one or more of:
   a threshold for a processing speed of the client device;
   a number of applications executing on the client device;
   a proximity of the client device to a user;
   a movement speed of the client device;
   a transmit power level of the client device;
   an environmental condition where the client device is located; or
   a temperature of the client device.

14. A client device comprising:
   an antenna; and
   one or more processing devices to:
      establish a plurality of communication links with a base station using the antenna;
      determine that the client device satisfies a communication link criterion, wherein the client device satisfies the communication link criterion in response to a battery level of the client device being below a defined status threshold; and
      in response to the battery level of the client device being below the defined status threshold, send, to the base station, a first measurement message comprising incorrect measurement data, wherein the incorrect measurement data is not indicative of one or more radio conditions for the at least one of the plurality of communication links;
      in response to the first measurement message comprising the incorrect measurement data being sent to the base station, receive a reconfiguration message from the base station, the reconfiguration message indicating a time at which the at least one of the plurality of communication links is to be reconfigured;
      reconfigure the at least one of the plurality of communication links at the time indicated in the reconfiguration message, wherein to reconfigure, the one or more processing devices to at least one of terminate the at least one of the plurality of communication links or establish a new communication link between the client device and the base station changing a number of the plurality of communication links between the client device and the base station; and
      responsive to determining that the battery level of the client device is above the defined status threshold, send a second measurement message to the base station, wherein the second measurement message comprises correct measurement data indicative of the one or more radio conditions for the at least one of the plurality of communication links.

15. The client device of claim 14, wherein to reconfigure the at least one of the plurality of communication links, the one or more processing devices to:
   decrease a data capacity of the at least one of the plurality of communication links.

16. The client device of claim 14, wherein the plurality of communication links comprises multiple-input-multiple-output (MIMO) communication links.

17. The client device of claim 14, wherein the incorrect measurement data comprises one or more of:
   a channel quality indicator for the one of the plurality of communication links;
   a pre-coding matrix indicator for the one of the plurality of communication links; or
   a rank indicator for the one of the plurality of communication links.

18. The client device of claim 14, wherein the plurality of communication links comprises one of:
   Long Term Evolution (LTE) communication links;
   High Speed Packet Access Plus (HSPA+) communication links;
   802.11ac communication links;
   802.11n communication links; or
   Worldwide Interoperability for Microwave Access (WiMAX) communication links.

19. The client device of claim 14, wherein the one or more processing devices further to:
   determine whether a second communication link criterion is satisfied;
   send a third measurement message to the base station in response to the second communication link criterion being satisfied;
   receive a second reconfiguration message from the base station; and
   reconfigure the one of the plurality of communication links.

20. The client device of claim 14, wherein the communication link criterion further comprises one or more of:
   a threshold for a processing speed of the system;
   a number of applications executing on the client device;
   a proximity of the client device to a user;
   a movement speed of the client device;
   a transmit power level of the client device;
   an environmental condition where the client device is located; or
   a temperature of the client device.

* * * * *